United States Patent [19]

Walters

[11] Patent Number: 4,832,454

[45] Date of Patent: May 23, 1989

[54] CONTROL CIRCUIT FOR A LIQUID CRYSTAL DISPLAY UNIT

[75] Inventor: Eckhard Walters, Röthenbach, Fed. Rep. of Germany

[73] Assignee: U.S. Philips Corporation, New York, N.Y.

[21] Appl. No.: 909,810

[22] Filed: Sep. 22, 1986

[30] Foreign Application Priority Data

Sep. 28, 1985 [DE] Fed. Rep. of Germany ....... 3534703

[51] Int. Cl.[4] ......................... G02F 1/13; G09G 3/18; G09G 3/02; G09G 3/00

[52] U.S. Cl. .................................... 350/332; 340/765; 340/805; 340/713

[58] Field of Search .................... 350/337, 332, 347 E, 350/331 T; 340/765, 784, 765, 805, 713; 307/307, 311; 368/4, 30

[56] References Cited

U.S. PATENT DOCUMENTS

| | | | |
|---|---|---|---|
| 4,236,150 | 11/1980 | Chern | 340/765 |
| 4,383,737 | 5/1983 | Hibino et al. | 350/347 E |
| 4,425,027 | 1/1984 | Portman | 350/331 T |
| 4,462,027 | 7/1984 | Lloyd | 350/331 T |
| 4,662,718 | 5/1987 | Masubuchi | 350/332 |

FOREIGN PATENT DOCUMENTS 3029122 2/1981 Fed. Rep. of Germany ...... 350/332

OTHER PUBLICATIONS

P. H. Smith, "Cut LCD-Digital-Interface Design Time and Hardware Co sts with Standard Chips", Electronic Design, vol. 27, No. 19, Sep. 13, 79, p. 118.

*Primary Examiner*—Stanley D. Miller
*Assistant Examiner*—Huy Kim Mai
*Attorney, Agent, or Firm*—Paul R. Miller

[57] ABSTRACT

Liquid crystal display units are finding increasing application in electrical appliances used for communications. If the appliance is for example a handset for a mobile radio transceiver and is held in a cradle on the dashboard, the angle of observation will change depending on whether the receiver is placed in the cradle or held in the hand. To ensure that the recognizability of the displayed information is not impaired upon a change in the position of the receiver, a control circuit automatically changes the contrast when such a change takes place. The circuitry required for this control is particularly simple when two different voltage values are generated by means of a switchable voltage-divider for two preset positions of the appliance. The switching takes place between the two voltage values in dependence upon the position of the cradle hook switch. The contrast (i.e. the amplitude of the voltage) is increased to a level which ensures that the displayed information is clearly legible from the new angle of observation.

8 Claims, 1 Drawing Sheet

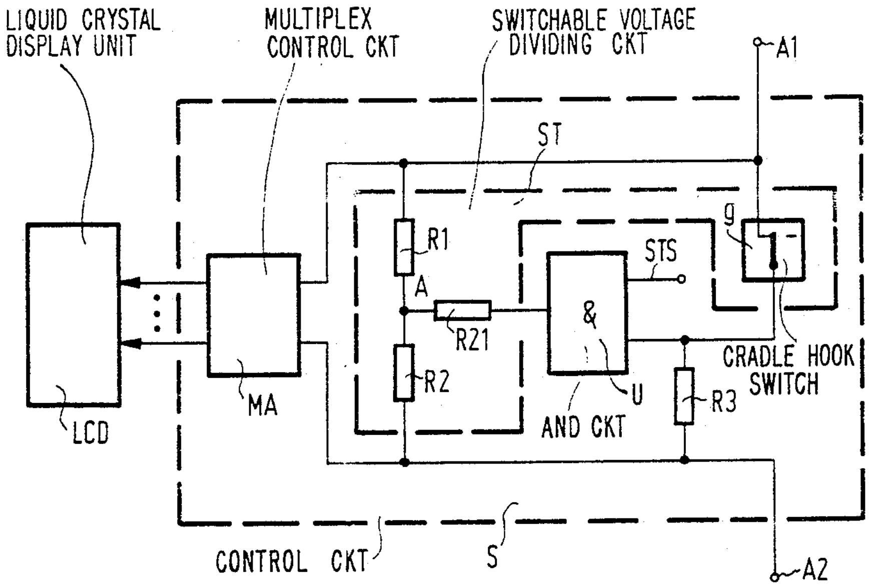
LIQUID CRYSTAL DISPLAY UNIT
MULTIPLEX CONTROL CKT
SWITCHABLE VOLTAGE DIVIDING CKT
A1
ST
g
R1
STS
A
&
R21
CRADLE HOOK SWITCH
R2
U
R3
LCD
MA
AND CKT
CONTROL CKT
S
A2

CONTROL CIRCUIT FOR A LIQUID CRYSTAL DISPLAY UNIT

The invention relates to a control circuit for a liquid crystal display unit which controls each segment of the liquid crystal display unit electrically, in particular for incorporation in a communications apparatus.

BACKGROUND OF THE INVENTION

Liquid crystal display units have hitherto found preferential application in quartz timepieces and pocket calculators. Since liquid crystal display units consume hardly any power in operation and therefore require a minimal power supply, they are finding increasing application in communications equipment as well.

In liquid crystal display units so-called "twisted nematic liquid crystals" are contained between a front and rear polarization layer. The molecules of the mesomorphous bonds are elongated, and in the nematic phase, disregarding heat fluctuations, the longitudinal axes of the molecules are in parallel alignment. When an electric field is applied to the liquid crystal, so-called Fréedericksz transitions take place, as a result of which, given a suitable arrangement of the polarizers, the initially opaque liquid becomes transparent.

In the absence of an external electric field, the direction of the axes of each molecular layer is twisted about a small angle relative to the neighbouring molecular layer. When the twisted planar liquid crystal layer is exposed to light which, at the input side, is linearly polarized along the mean direction of the longitudinal axes of the molecules, the plane of polarization in the layer rotates in accordance with the twisted structure of the molecular layers. If the direction of polarization of the rear polarizer is the same as the mean direction of the longitudinal axes of the molecules, correspondingly polarized light is able to enter the liquid crystal display unit and is rotated in correspondence with the twist of the planar layers. If for example the light (daylight or light from a lamp) enters from the rear with horizontal polarization, it is vertically polarized when it emerges from the liquid crystal layer. If the front polarizer is likewise vertically oriented, the light will pass through it unhindered and the image surface appears bright to the observer.

In liquid crystal display units the liquid-crystalline layer is sandwiched between rear and front glass plates (and between a seal encapsulating the glass plates), which are provided with transparent electrodes. When a voltage is applied to the two electrodes the liquid-crystalline layer is exposed to an electric field which orients all molecular layers in the direction of the field, thereby removing the twist in the liquid crystalline layer and hence the rotation of the direction of polarization of the light passing through. When horizontally polarized light enters from the rear, it encounters the vertically oriented front polarizer, which does not allow it to pass. The observer thus sees the image surface as dark.

For displaying symbols, graphs and pictures it is common practice to use a matrix display, i.e. a display with image elements arranged horizontally and vertically parallel to one another. To display a set of particular characters or symbols, e.g. numbers, it is also common practice, however, to use a segment display, e.g. 7-segment display. For addressing or selecting the image elements and controlling their brightness, a control circuit is connected to the liquid crystal display unit. The brightness control is frequently performed by means of pulse-amplitude modulation, that is to say the amplitude of the control pulses determines the light transmission and hence the brightness of the image element. In multiplex control with a high multiplex ratio (e.g. 1:8) the line and column electrodes are driven with short pulses, whereby the difference in voltage amplitude between the segments (or image points) switched on and those switched off decreases with increasing multiplex ratio, resulting in a low contrast ratio in the liquid crystal display unit.

As can be seen from the isocontrast characteristics of liquid crystal display units, the recognizability of the information depends on the range of angles from which the display is observed. An isocontrast characteristic is a line in a polar diagram which indicates the direction in space and in which the contrast of the liquid crystal display unit has a constant value. The contrast ratio changes depending on the orientation of the liquid crystal unit (expressed by the angles alpha and phi).

A liquid crystal display unit for a motorized vehicle is known from German Offenlegungsschrift No. DE-PS 30 29 122. The transmissive display unit is fitted at the rear with a light-conducting body, which is movable to allow optionally for exposing the liquid crystal layer to daylight or to light from an artificial light source. In the daytime setting the light source is switched off and the daylight is beamed through a lens to illuminate the light-conducting body. This light-conducting body is coated at the rear with a reflecting layer, which causes the incident daylight to illuminate the liquid crystalline layer from the rear. In the nighttime setting the light-conducting body lies against the rear of the liquid crystal display unit and the light source is switched on. The light reflected from the coating of the light-conducting body serves for illuminating the liquid crystal display unit. The brightness of the liquid crystal display unit known from the above-mentioned German Offenlegungsschrift No. 30 29 122 is controlled by the brightness of ambient light or by the luminous flux of a light source. These values are chosen in such a way that the information is readily recognizable within a prescribed range of observation angles.

SUMMARY OF THE INVENTION

The object of the invention is to provide a control circuit for a liquid crystal display unit which control circuit ensures that upon any change in the position of the liquid crystal unit incorporated in an apparatus the displayed information remains clearly recognizable. This object is achieved according to the invention by a control circuit having the features characterized in that upon a change in the position of the apparatus, the control circuit automatically changes the contrast in such a way that the information remains recognizable within a new range of observation values.

By virtue of the fact that the control circuit according to the invention automatically changes the contrast when the position of the apparatus changes, the recognizability of the information is ensured in every new angle of observation. The contrast is understood to be the quotient of the difference and sum of the luminances of the bright and dark parts (on and off segments) of the display surface.

If in accordance with the fact that the control circuit generates for two present positions of the apparatus two different voltage values for a multiplex control circuit connected to the electrodes of the liquid crystal display unit only two voltage values—corresponding to the two preset positions of the apparatus—are generated for the multiplex control connected to the display electrodes of the liquid crystal display unit, then the circuitry required for the control is minimal. Two such different positions are found in the incorporation of the liquid crystal display unit in the handsets of a mobile transceiver. In the not previously published P No. 35 07 016.1 a two-part receiver cradle is proposed, which can be fixed to a suitable place on the dashboard. The receiver is provided at the upper side with display devices arranged in special fields and with selector keys. When the receiver is lifted from the cradle the isocontrast characteristic is given by the solid angle alpha=10° and phi=270° and when it is replaced on the cradle it is given by alpha=45° and phi=225°. The change in contrast by means of presetting two different voltage values is easily implemented.

The two voltage values are preferably generated by means of a switchable voltage divider. The circuitry required for switching the voltage divider is particularly simple if the switching of a voltage dividing circuit is effected by a cradle hook switch in the communications apparatus, the cradle hook switch is used for this purpose, or if the switching is effected by a position sensor, such as a mercury switch, then the position sensor is used.

If the switching of the position of the cradle hook switch is additionally made dependent on a control signal from a control device fitted in the communications apparatus, user requirements can also be met at mounting locations where a change of contrast is not desired.

Further advantageous embodiments of the invention are indicated in the subordinate claims.

BRIEF DESCRIPTION OF THE DRAWING

The invention will be explained and described in more detail in the following with reference to an embodiment shown in the drawing.

DESCRIPTION OF THE PREFERRED EMBODIMENTS

Static, unmultiplexed liquid crystal display units are operated with, for example, a level of ±5 V alternating voltage (approx. 100 Hz) with controlled segments, the level of the "Off" segment being equal to 0 V.

In the case of multiplexed liquid crystal display units, control with an alternating voltage between the given electrode and the counter electrode is only possible when the level "Off" is greater than 0 V and the level "On" is less than the maximum voltage. The difference between "Off" and "On" levels decreases with rising multiplex ratio; and the contrast ratio between "Off" and "On" segments increases correspondingly.

The control voltages of the multiplexed liquid crystal display unit must be adjusted in such a way that the "Off" segments or points are scarcely visible from the chosen angle of observation.

The ratio of the control level $V_{on}/V_{off}$ of the segments is prescribed by the multiplex ratio, the absolute values of the voltages $V_{on}$ and $V_{off}$ are dependent on the solid angle.

In the LCD Specification Standard of the Valvo specifications of liquid crystal displays, 6.83, pages 58 et seq, a liquid crystal display unit with a multiplex ratio of 1:8 is described. For alpha=10° the contrast ratio is given as 1.447, $V_{OP}$ as 3.85 V, $V_{on}$ as 1.66 V, and $V_{off}$ as 1.12 V.

Connected to a liquid crystal display unit LCD in the drawing figure is a control circuit S which drives each segment of the liquid crystal display unit LCD. The control circuit S generates, for two prescribed positions of the apparatus, two different voltage values for a multiplex control circuit MA connected to the electrodes of the liquid crystal display unit LCD. For generating the two voltage values, the control circuit S has a switchable voltage-dividing circuit ST.

The switchable voltage-dividing circuit ST contains a voltage divider connected to the two supply voltage terminals A1, A2 which has the resistors R1, R2, a resistor R 21 connected to the tap A of the voltage divider and a cradle hook switch g connected to the second terminal of the latter resistor, or R21.

Depending on the switching position of the cradle hook switch g, that is to say depending on whether the receiver has been lifted from the cradle or not, one or the other voltage value is prescribed for the multiplex control MA. If, for example, the receiver is placed in the cradle fitted to the dashboard, the voltage value for the multiplex control MA is higher. If the operational voltage $V_{OP}$ is raised for example to 5 V, the indicated liquid crystal display unit then has 2.15 V for $V_{on}$ and 1.45 V for $V_{off}$. Due to the higher voltage value, the contrast also increases both at the "On" and at the "Off" segments, so that the information is now readily recognizable in this range of observation angles. At alpha=10°, on the other hand, the "Off" segments are already visible, which means to say that the contrast of the "Off" segments is too high at this observation angle.

For the aforesaid application a dark-field display is preferred, that is to say a display in which the information is shown with bright characters on a dark background.

If the receiver cradle is fixed, for example, between the front seats of the vehicle, the control circuit S is supplemented with an AND element U. The output of the AND element U is connected to the second terminal of resistor R21. The first input of the AND element U is connected via the cradle hook switch g to the terminal A1, and a control signal STS from a control circuit incorporated in the communications apparatus is fed to the second input of the AND element U. The control signal STS can now be used to ensure that the contrast is not switched or changed upon a change in the position of the receiver.

What is claimed is:

1. A control circuit arrangement for liquid crystal display units used in communications apparatus comprising liquid crystal display means for displaying information in a liquid crystal display, and control circuit means for electrically controlling each segment of said liquid display means, said control circuit means automatically changing contrast of said liquid crystal display means when said liquid crystal display means is changed from a given line of sight to maintain said information recognizable within a new range of observation angles, wherein said control circuit means includes a multiplex means for generating signals to electrodes of said liquid crystal display means in response to two different voltage values, said two different voltage values being provided for two present positions of a communications apparatus.

2. A control circuit arrangement according to claim 1, wherein switchable voltage-dividing circuit means are disposed in said control circuit means for generating said two different voltage values.

3. A control circuit arrangement according to claim 2, wherein cradle hook switching means are disposed in said control circuit means for switching said voltage-dividing circuit means.

4. A control circuit arrangement according to claim 3, wherein said communications apparatus provides a control signal for switching said cradle hook switching means.

5. A control circuit arrangement according to claim 3, wherein said switchable voltage-dividing means includes a voltage divider tap between supply voltage terminals and a first terminal of a resistor, said resistor having a second terminal connected to one of said supply voltage terminals through said cradle hook switching means.

6. A control circuit arrangement according to claim 5, wherein said second terminal of said resistor is connected to an output of an AND circuit, said AND circuit having a first input connected to said cradle hook switching means and a second input receiving a control signal.

7. A control circuit arrangement according to claim 2, wherein position sensing means are disposed in said control circuit means for switching said voltage-dividing circuit means.

8. A control circuit arrangement according to claim 7, wherein said position sensing means is a mercury switch.

* * * * *